US009832142B2

(12) United States Patent
Baldor

(10) Patent No.: US 9,832,142 B2
(45) Date of Patent: *Nov. 28, 2017

(54) RADIO FREQUENCY SIGNAL ROUTER

(71) Applicant: Evertz Microsystems Ltd., Burlington (CA)

(72) Inventor: Daniel Baldor, Toronto (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,251

(22) Filed: Mar. 31, 2017

(65) Prior Publication Data
US 2017/0272382 A1 Sep. 21, 2017

Related U.S. Application Data

(63) Continuation of application No. 14/964,967, filed on Dec. 10, 2015, now Pat. No. 9,647,958, which is a continuation of application No. 13/447,817, filed on Apr. 16, 2012, now Pat. No. 9,240,958.

(51) Int. Cl.
*H04L 12/28* (2006.01)
*H04L 12/933* (2013.01)
*H04L 12/773* (2013.01)
*H04L 12/939* (2013.01)

(52) U.S. Cl.
CPC .............. *H04L 49/15* (2013.01); *H04L 45/60* (2013.01); *H04L 49/1515* (2013.01); *H04L 49/1523* (2013.01); *H04L 49/552* (2013.01)

(58) Field of Classification Search
CPC ...... H04L 49/15; H04L 45/60; H04L 49/1515; H04L 49/1523; H04L 49/552
See application file for complete search history.

(56) References Cited

U.S. PATENT DOCUMENTS

| | | | |
|---|---|---|---|
| 7,555,309 B2* | 6/2009 | Baldor | H01P 5/16 455/403 |
| 9,240,958 B2 | 1/2016 | Baldor | |
| 2002/0197001 A1* | 12/2002 | Hayashi | H04Q 11/0005 385/17 |
| 2006/0256766 A1 | 11/2006 | Baldor et al. | |
| 2008/0244028 A1 | 10/2008 | Le et al. | |
| 2009/0010408 A1* | 1/2009 | Altberg | G06Q 10/10 379/114.01 |
| 2009/0178119 A1 | 7/2009 | Macauley | |
| 2011/0135316 A1 | 6/2011 | Fankhauser et al. | |

(Continued)

*Primary Examiner* — Abdelnabi O Musa
(74) *Attorney, Agent, or Firm* — Bereskin & Parr LLP/S.E.N.C.R.L., s.r.l.

(57) ABSTRACT

A RF router for routing n input signals to m destinations, where the router comprises a backplane coupled to a plurality of RF input terminals, a plurality of RF output terminals, a plurality of splitters and a plurality of connectors. The backplane is also coupled to a controller and a plurality of connectors for receiving a plurality of switching matrices. The RF router comprises a plurality of u×v input switch matrices, a plurality of p×q intermediate switch matrices and a plurality of r×s output switch matrices, where at least one of the plurality of u×v input switch matrices, the plurality of p×q intermediate switch matrices and the plurality of r×s output switch matrices are redundant.

8 Claims, 13 Drawing Sheets

(56) References Cited

U.S. PATENT DOCUMENTS

2011/0222506 A1* 9/2011 Szymanksi ......... H04W 72/082
                                                    370/330
2011/0251992 A1   10/2011 Bethlehem et al.
2012/0230683 A1   9/2012 Lacatus et al.

* cited by examiner

RADIO FREQUENCY SIGNAL ROUTER

CROSS-REFERENCE TO RELATED APPLICATIONS

This application is a continuation of U.S. patent application Ser. No. 14/964,967, filed Dec. 10, 2015, which is a continuation of U.S. patent application Ser. No. 13/447,817, filed on Apr. 16, 2012 (now issued as U.S. Pat. No. 9,240,958). The entire contents of U.S. patent application Ser. No. 14/964,967 and U.S. application Ser. No. 13/447,817 are incorporated by reference herein.

FIELD OF THE INVENTION

This invention relates to routers for radio frequency signals.

BACKGROUND OF THE INVENTION

Radio frequency (RF) signals are commonly switched between source and destination devices using patch panels. In a static system, patch panels may be simple and inexpensive to use. However, patch panels may not be well equipped to manage dynamic systems, such as, for example, those systems where signal routes are frequently changed. Patch panels may also be undesirable when RF signals are switched between a large number of sources and destinations. This may be because switching between a large number of sources and destinations may require a large number of cables that may have to be manually patched, making the experience very labour intensive.

Conventional RF routers (or RF routing switchers) route RF signals between source and destination using solid state switches. The purpose of an n×m RF router is to allow the user to connect RF signals from up to "n" source devices to as many as "m" destination devices. Some devices may be both source and destination devices and may be coupled to either one or more inputs of a RF router and to one or more outputs of the RF router. The variable "n" refers to the number of RF input signals the router can accommodate and "m" refers to the number of outputs the router supports. The number of inputs and outputs that a RF router can handle is often referred to as the size, format or dimension of a router. For example, a router capable of routing 64 inputs to 32 outputs has a size or format of 64×32.

Through a controller (which may be integrated with the router or may be externally coupled to the router), an n×m RF router can be configured to direct any of its n inputs to be routed to any combination of its m outputs. This enables the user to connect RF source devices to the router's inputs, and RF destination devices to the router's outputs, and make and break connections without having to rewire the circuit every time that a new configuration is desired.

RF signals are used to transmit increasingly complex data signals. For example, digital audio/video signals for high definition television contain significantly more information than older forms of RF signals such as AM radio. In addition, many more signals must be processed in modern signal processing systems. In some regions, hundreds of signals are available for viewing or listening. Due to the prevalence of the use of RF signals to transmit data, and the corresponding increase in complexity in RF signal networks, there is a need for large format n×m RF routers.

As the RF router dimensions increase, several undesirable features result. RF routers with high numbers of inputs and outputs typically are physically very large, due to the common practice of using active components to divide incoming signals. Large number of active components occupies a substantial space on a circuit board. The use of a large number of active components also increases the amount of energy consumed by a typical router, and simultaneously increases the likelihood of malfunction.

SUMMARY

In a first aspect, some embodiments of the invention provide a RF router for routing n input signals to m destinations, where the router comprises a backplane coupled to a plurality of RF input terminals, a plurality of RF output terminals, a plurality of splitters and a plurality of connectors. The backplane is also coupled to a controller and a plurality of connectors for receiving a plurality of switching matrices. The RF router comprises a plurality of u×v input switch matrices, a plurality of p×q intermediate switch matrices and a plurality of r×s output switch matrices, where at least one of the plurality of u×v input switch matrices, the plurality of p×q intermediate switch matrices and the plurality of r×s output switch matrices are redundant. In this example, the plurality of splitters and the plurality of combiners, and the backplane providing electrical interconnections between the plurality of switch matrices, connectors, splitters, and RF input and output terminals are passive.

In some cases, the RF router comprises a tone injecting module for injecting tones into incoming RF signals when the signal arrives at some or all of the u×v input switch matrices. The RF router also comprises a tone monitoring module for monitoring the tones when the signals arrive at some or all of the u×v input switch matrices, p×q intermediate switch matrices and r×s output switch matrices.

In various cases, the backplane of the RF router comprises self-terminating connectors that are configured to close two or more pins of the connector in the absence of any switch matrices or cards comprising the switch matrices.

The RF router may further comprise sensors in the switching matrices to detect their removal from the connectors coupled to the backplane. The sensors may be capacitive sensors. The switching matrices may comprise module ejectors and the sensors may be configured to detect proximity of approaching objects or actual contact by the objects to detect an upcoming or actual removal of the switching matrices from the connectors.

In various cases, the backplane of the RF router is configured such that the lengths of each of the traces from splitters to u×v input switch matrices are equal. Similarly, the lengths of each of the traces from u×v input switch matrices to p×q intermediate switch matrices are equal. The backplane further comprises equal traces from the p×q intermediate switch matrices to r×s output switch matrices and from r×s output switch matrices to combiners.

In another broad aspect, there is provided a RF router comprising: a controller; an input stage comprising a plurality of RF input terminals configured to receive input RF signals, a plurality of u×v input switch matrices, and a splitter connected to each RF input terminal for coupling a corresponding input RF signal to at least one u×v input switch matrix; a plurality of p×q intermediate switch matrices, where inputs of each p×q intermediate switch matrices are coupled to outputs of the u×v input switch matrices such that each input of each p×q intermediate switch matrix is coupled to exactly one output of the plurality of u×v input switch matrices; an output stage comprising: a plurality of r×s output switch matrices, wherein inputs of each r×s output switch matrix are coupled to outputs of the p×q intermediate switch matrices such that each input of each r×s output switch matrix is coupled to exactly one output of the plurality of p×q intermediate switch matrices; and a combiner coupled between the plurality of r×s output switch matrices and a plurality of RF output terminals, wherein each RF output terminal is configured to provide an output RF signal; and wherein at least one of the plurality of u×v input switch matrices, the plurality of p×q intermediate switch matrices and the plurality of r×s output switch matrices are redundant.

In some cases, the inputs of each p×q intermediate switch matrix are coupled to different u×v input switch matrices.

In some other cases, the inputs of each r×s output switch matrix are coupled to different p×q intermediate switch matrices.

The splitters of the RF router may be configured to couple the corresponding input RF signal to different u×v input switch matrices.

The combiners of the RF router may be configured to couple different r×s output switch matrices to a RF output terminal.

In some cases, the RF router of claim 1, wherein the RF router has at least 64 RF input terminals. In some other cases, the RF router has at least 64 RF output terminals.

In some cases, wherein when the RF router has 64 RF input terminals and 64 RF output terminals, the RF router comprises 16 u×v input switch matrices, 16 p×q intermediate switch matrices and 16 r×s output switch matrices, wherein the plurality of u×v input switch matrices, the plurality of p×q intermediate switch matrices and the plurality of r×s output switch matrices are 8×8 switch matrices.

In some cases, wherein when the RF router has 64 RF input terminal and 128 RF output terminals, the RF router comprises 16 u×v input switch matrices, 16 p×q intermediate switch matrices and 32 r×s output switch matrices, wherein the plurality of u×v input switch matrices and the plurality of r×s output switch matrices are 8×8 switch matrices, and the plurality of p×q intermediate switch matrices are 8×16 switch matrices.

In some cases, the RF router of claim 6, wherein when the RF router has 128 RF input terminals and 128 RF output terminals, the RF router comprises 32 u×v input switch matrices, 16 p×q intermediate switch matrices and 32 r×s output switch matrices, wherein the plurality of u×v input switch matrices and the plurality of r×s output switch matrices are 8×8 switch matrices, and the plurality of p×q intermediate switch matrices are 16×16 switch matrices.

The splitters of the RF router may be passive splitters. The combiners of the RF router may be passive combiners.

In some cases, each RF input terminal has an external signal impedance and the RF router has an internal signal impedance. In such cases, the input stage further comprises an impedance matching stage coupled between each RF input terminal and the corresponding splitter, wherein the impedance matching stage the external signal impedance to the corresponding RF input terminal and the internal signal impedance to the corresponding splitter.

In some cases, at least some r×s output switch matrices comprise an automatic gain control stage, wherein each automatic gain control stage operates to adjust the gain of an incoming RF signal.

At least some of the u×v input switch matrix may comprise an equalization stage to equalize the input RF signal.

In some cases, at least some r×s output switch matrices comprise an equalization stage coupled to the automatic gain control stage, wherein each of the equalization stage is configurable to equalize the incoming RF signal.

At least some p×q intermediate switch matrices may comprise an equalization stage for equalizing an incoming RF signal.

The RF router may further comprise a tone insertion module coupled to the plurality of splitters, wherein the tone insertion module is configured to insert a unique tone signal to each of the split input signal corresponding to each input RF signal.

The RF router may further comprise a plurality of tone monitoring modules coupled to at least one u×v input switch matrix, at least one p×q intermediate switch matrix and at least one r×s output switch matrix, wherein the tone monitoring modules are configured to monitor the unique tone signal.

In some cases, the RF router may comprise a plurality of connectors for receiving the plurality of u×v input switch matrices, the plurality of p×q intermediate switch matrices and the plurality of r×s output switch matrices, wherein each connector is a self-terminating connector configured to close opposing pins of the connector to provide an impedance in an unconnected mode.

At least one u×v input switch matrix, at least one p×q intermediate switch matrix and at least one r×s output switch matrix of the RF router may comprise a sensor configured to detect removal of the u×v input switch matrices, p×q intermediate switch matrices and r×s output switch matrices from the plurality of connectors.

In some cases at least one u×v input switch matrix, at least one p×q intermediate switch matrix and at least one r×s output switch matrix comprise a sensor configured to detect insertion of the u×v input switch matrices, p×q intermediate switch matrices and r×s output switch matrices to the plurality of connectors.

In some cases, at least one u×v input switch matrix, at least one p×q intermediate switch matrix and at least one r×s output switch matrix comprise a module ejector. In such cases, the sensor is configured to detect whether the module ejector is in an open or close state to detect removal of the u×v input switch matrices, p×q intermediate switch matrices and r×s output switch matrices to the plurality of connectors.

The sensor may be a capacitive sensor.

The input RF terminals and the output RF terminals may comprise a BNC connector.

In some cases, the distances between each splitter and each u×v input switch matrix, each u×v input switch matrix and each p×q intermediate switch matrix, each p×q intermediate switch matrix and each r×s output switch matrix, and each r×s output switch matrix and each combiner are equal.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known procedures and components have not been described in detail so as not to obscure the embodiments described herein. Furthermore, this description is not to be considered as limiting the scope of the embodiments described herein in any way, but rather as merely describing implementation of the various embodiments described herein.

Figure 1:
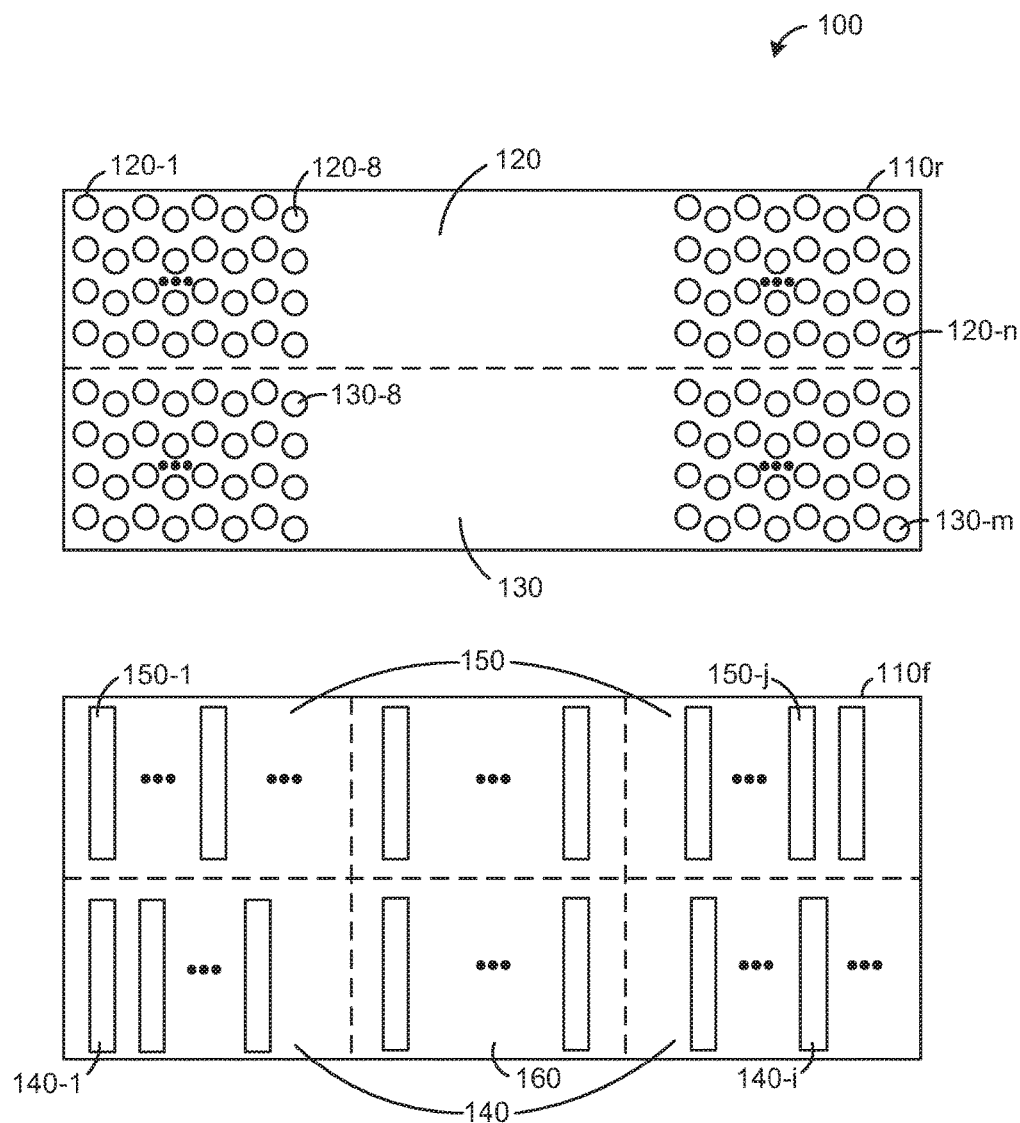
FIG. 1 illustrates a first example of an RF router 100 with dimensions of n RF input terminals×m RF output terminals.

Reference is first made to FIG. 1, which illustrates a first example of an RF router 100 with dimensions of n RF input terminals×m RF output terminals. The rear side 110r of router 100 comprises a plurality of RF input terminals 120 and a plurality of RF output terminals 130. In a RF router 100 with a dimension of n×m, there are 'n' RF input terminals 120 and 'm' RF output terminals 130.

The n RF input terminals are identified at reference numerals 120-1 to 120-n. The m first RF output terminals are identified at reference numerals 130-1 to 130-m. RF Router 100 is configured to connect any of the n RF input terminals 120 to any of the m RF output terminals 130. In some embodiments, the RF router 100 is configured to accommodate 128 RF input terminals and 128 RF output terminals.

The RF router 100 is configured to connect the n RF input terminals 120 to the m RF output terminals 130. The RF router 100 is also configured to provide redundancy allowing signal paths to be rerouted in the event of a failure in part of the router 100. For example, in the event of any component failure in an RF signal path, the built-in redundancy facilitates re-routing of the signal path.

The front side 110f of router 100 comprises a plurality of switch matrices. As illustrated, the front side 110f of the router 100 comprises u×v input switch matrices 140, p×q intermediate switch matrices 160 and r×s output switch matrices 150. Each of the plurality of switch matrices 140, 150, 160 is a separate unitary element assembled on a card, which includes a printed circuit board. A first u×v input switch matrix is illustrated as 140-1 and an $i^{th}$ u×v input switch matrix is illustrated as 140-i. Similarly, A first r×s output switch matrix is illustrated as 150-1 and a $j^{th}$ r×s output switch matrix is illustrated as 150-j.

A CLOS switching network provides an advantage of connecting a large number of input terminals to a large number of output terminals by using fewer and small-sized switches than other switching architectures. CLOS switching networks are a three-stage unidirectional switching network, typically including a number of crossbar switches at each stage. A CLOS network is typically defined in terms of three integers, n, m and r, where r represents a number of switches in the first stage, n represents a number of sources or inputs feeding into each of r switches, and m represents a number of outlets for each of the r switches. Accordingly, there are r switches in the first stage, with each switch having n inputs and 'm' outputs. The second stage has m switches, each with r inputs and r outputs. The third stage has r switches, each with m inputs and n outputs.

A CLOS network can be a strict-sense non-blocking network when an unused input on a switch at the first stage can be routed to an unused output on a switch at the third stage without having to re-route any existing signal routes. A sufficient condition for strict-sense non-blocking is that 'm' be greater than or equal to '2n−1'. A CLOS network can be a rearrangeably non-blocking network when an unused input on a switch at the first stage is routed to an unused output on a switch at the third stage by rearranging existing signal routes. A sufficient condition for a rearrangeably non-blocking CLOS network is that 'm' be greater than or equal to 'n'.

Figure 2:
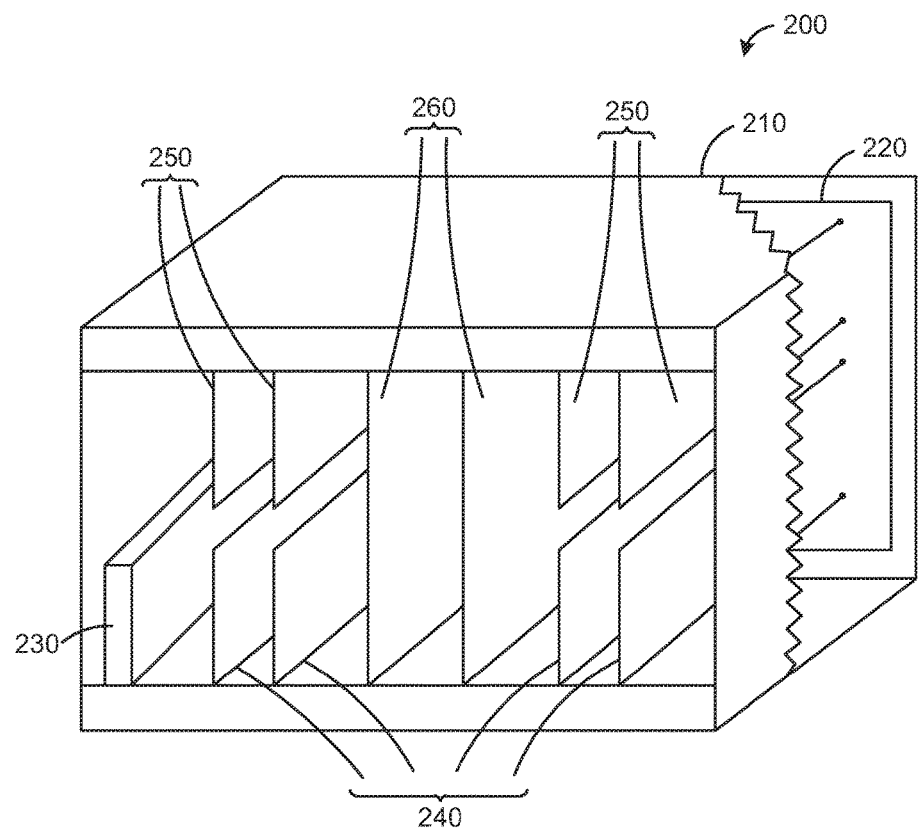
FIG. 2 illustrates a second example of an RF router 200 with dimensions of n RF input terminals×m RF output terminals.

Reference is first made to FIG. 2, which illustrates a second example of an RF router 200 with dimensions of n RF input terminals×m RF output terminals. RF router 200 has a modular structure and is assembled in a frame or chassis 210. For example, the RF router 200 may be assembled in a rack mounted chassis. In some embodiments, the router 100 may have a non-modular structure.

In some embodiments, the RF router 200 may be assembled in a single chassis. For example, the RF router 200 may be configured to accommodate 128 input RF signals and 128 output RF signals in a single chassis. In some other embodiments, the RF router 200 may be assembled over multiple chassis cascaded together. For example, the RF router 200 may be configured to accommodate large format RF routers, such as, a 1024×1024 RF router over multiple chassis cascaded together.

The router 200 comprises a backplane 220. The backplane 220 comprises a plurality of connectors coupled to the backplane 220 for receiving the plurality of switch matrices. The plurality of u×v input switch matrices 240 are received by a plurality of input switch connectors, the plurality of p×q intermediate switch matrices 260 are received by a plurality of intermediate switch connectors and the plurality of r×s output switch matrices 250 are received by a plurality of output switch connectors. Each of the switch matrices 240, 250, 260 can be inserted or removed from the connectors independently. The backplane 220 provides electrical interconnections between the plurality of switch matrices, as well as to the plurality of RF input terminals, such as the RF input terminals 120 and the plurality of RF output terminals, such as the RF output terminals 130.

The router 200 also comprises a controller 230 installed within the chassis 210. In other embodiments, controller 230 may be provided as an independent device and may be coupled to the various switch matrices externally. For example, the controller 230 may be mounted in a separate rack mounted chassis and may be combined with other device in that chassis.

Controller 230 may be distributed or may be a part of a larger control system for a communication and signal processing system. Controller 230 may control RF router 200 and other devices in the communication system and will be coupled to such devices, typically through a control data network. Typically, the controller will control RF router 200 and such other devices in response to requests or control instructions received from other devices or from a user of the RF router 200 or the communication system.

In various embodiments, the connectors attached to the backplane 220 for receiving the plurality of switch matrices or cards comprising the switch matrices are self-terminating connectors. Self-terminating connectors are configured to close two or more pins of the connector in the absence of any switch matrices or cards comprising the switch matrices. For instance, a self-terminating connector may be configured to close opposing pins of the connector. Two or more pins of the connector may be closed by, for example, touching the two or more pins together.

A self-terminating connector may also be configured to close the opposing pins as soon as a switch matrix or a card comprising the switch matrix is removed from the connector. For example, in router 200, removal of a switch matrix or a card comprising the switch matrix from the connector may be detected and the state of the connector may be changed from open to close based on such detection.

The self-terminating connector provides terminal impedance in the signal path of the router 200 when the pins on the connector close. The terminal impedance may be any impedance equal to the internal signal impedance for impedance matching in the signal path. For example, the self-terminating connector may provide terminal impedance of 50 ohms, 75 ohms or any other suitable impedance equal to the internal signal impedance to maintain impedance matching within the router 200, depending on the cables and devices used in or with the router. This helps to reduce impact on other signals or signal paths upon removal of one or more switch matrices from one or more connectors.

Figure 3A:
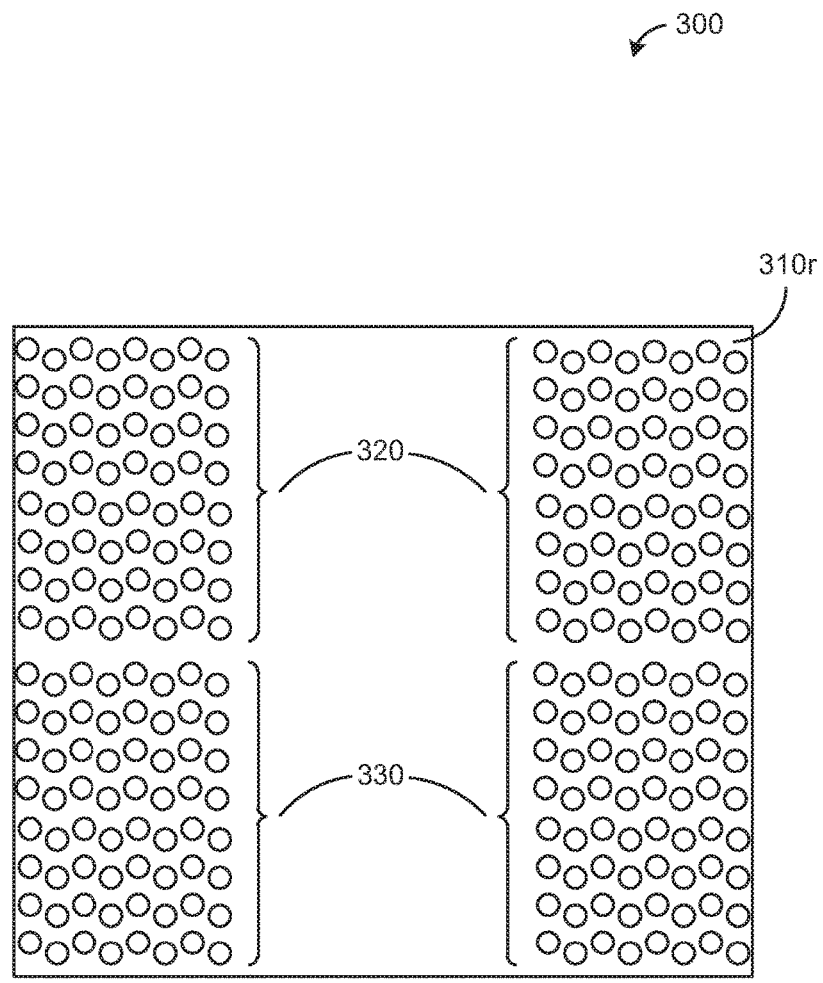
FIG. 3A illustrates a rear view of an example embodiment of a RF router 300 with a dimension of 128 RF input terminal×128 RF output terminals.
Figure 3B:
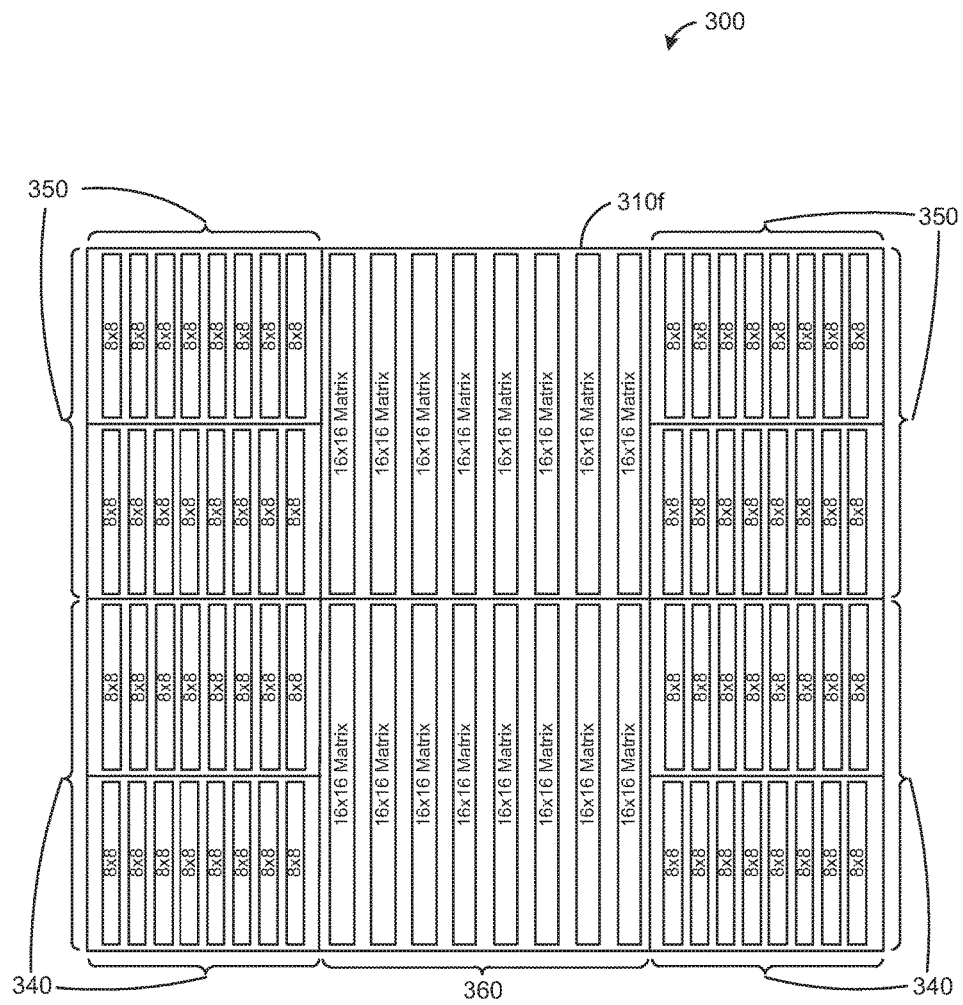
FIG. 3B illustrates a front view of an example embodiment of a RF router 300 with a dimension of 128 RF input terminal×128 RF output terminals.

Reference is next made to FIGS. 3A and 3B, illustrating an example embodiment of a RF router 300 with a dimension of 128 RF input terminal×128 RF output terminals. FIG. 3A illustrates a rear view 310r of the router 300. Router 300 comprises 128 RF input terminals 320 and 128 RF output terminals 330. The RF input and output terminals may be any type or any combination of types of connectors. For example, these terminals may be 50 ohms BNC connectors, 75 ohms BNC connectors, SMA, Type F, Type N or other types of signal connector.

FIG. 3B illustrates a front view 310f of the router 300. In the example embodiment of router 300 with a dimension of 128 RF input terminals and 128 RF output terminals, router 300 comprises 32 u×v input switch matrices 340, 32 r×s output switch matrices 350 and 16 p×q intermediate switch matrices 360. Each of the u×v input switch matrices are 8×8 switch matrices, configured to connect up to 8 inputs to any one of the 8 outputs. Each of the r×s output switch matrices are also 8×8 switch matrices and each of the p×q intermediate switch matrices are 16×16 switch matrices. The arrangement of various switch matrices in the router 300 are by way of an example only and are not to be construed as limiting in any way.

Figure 4A:
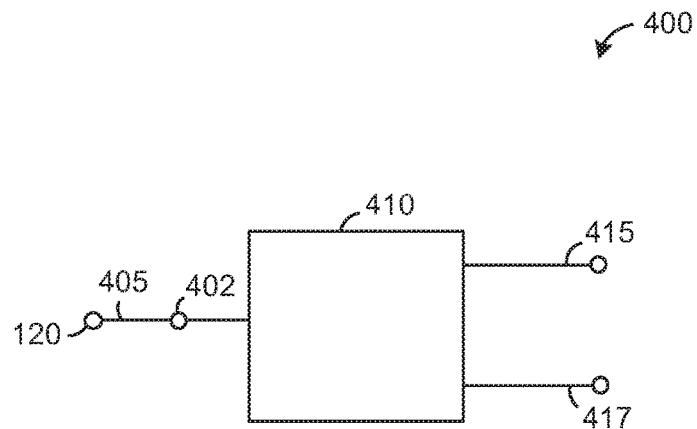
FIG. 4A illustrates an example RF signal path from an RF input terminal 120 to an input of a u×v input switch matrix for a RF router 400.

Reference is next made to FIGS. 4A-4D, illustrating example embodiments of input signal paths within a RF router. FIG. 4A illustrates an example RF signal path from an RF input terminal 120 to an input of a u×v input switch matrix for a RF router 400. The general signal path comprises a splitter 410.

In the illustrated embodiment, the splitter 410 is a 1×2 passive splitter, which comprises an incoming port 402 coupled to the RF input terminal 120 and two outgoing ports 404 and 406 coupled to the input switch matrices (not shown). The incoming port 402 receives an input RF signal and the outgoing ports 404, 406 provide the input RF signal at two locations. The splitter 410 is a passive splitter and is configured to split the input RF signal without any signal processing, such as, signal amplification.

Figure 4B:
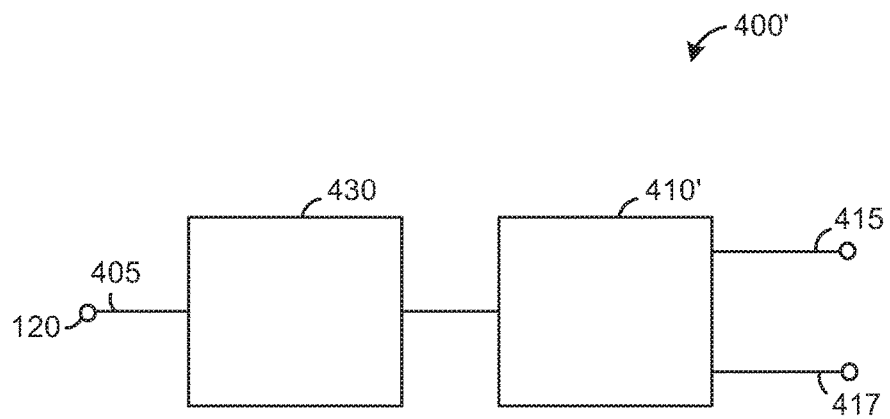
FIG. 4B illustrates another example of a RF signal path from an RF input terminal 120 to a u×v input switch matrix for a RF router 400'.

FIG. 4B illustrates another example of a RF signal path from an RF input terminal 120 to a u×v input switch matrix for a RF router 400'. In this embodiment, each signal path comprises an impedance matching stage 430 and a splitting stage 410'. The splitting stage 410' may be similar to the splitter 410 of FIG. 4A.

In router 400', RF input terminals 120 have external signal impedance selected to be compatible with the device or devices that produce the RF input signals. For example, RF input terminals 120 may be coaxial cable terminals and the external signal impedance may be seventy-five ohms, as is typical in many coaxial cable communication systems. In other embodiments, the external signal impedance may be any other impedance suitable for coupling to devices that produce the input RF signals.

Router 400' also has internal signal impedance. The internal signal impedance may be selected based on the impedance characteristics of the terminals of the switch matrices, such as switch matrices 140, 150, 160 or any other characteristics of the router 400'. For example, if the output terminals of the p×q intermediate switch matrices 160 have an impedance of fifty ohms, the internal signal impedance may be selected to be fifty ohms.

As illustrated, an input RF signal 405 is received at a corresponding RF input terminal 120. The RF input terminal 120 is coupled to an impedance matching stage 430. Impedance matching stage 430 provides an input impedance that matches the external signal impedance of router 400' and an output impedance that matches the internal signal impedance of the router 400'.

In some embodiments, the external signal impedance and the internal signal impedance of the router 400' are equal. In such cases, no impedance matching may be required and the impedance matching stage 430 may be an optional stage.

Figure 4C:
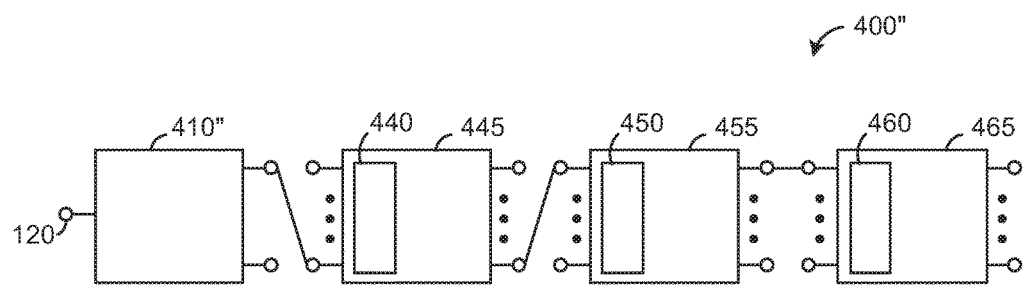
FIG. 4C illustrates another example of a RF signal path from an RF input terminal 120 to a r×s output switch matrix 465 for a RF router 400"

FIG. 4C illustrates another example of a RF signal path from an RF input terminal 120 to a r×s output switch matrix 465 for a RF router 400". Router 400" comprises a splitting stage 410", similar to the splitter 410. Router 400" also comprises various equalization stages 440, 450, 460 along the signal path. For example, router 400" may comprise equalization stage 440 in some or all of the u×v input switch matrices 445, equalization stage 450 in some or all of p×q intermediate switch matrices 455 and equalization stage 460 in some or all of r×s output switch matrices 465. The equalization stages 440, 450, 460 receive an RF signal and processes it to provide an equalized signal. For example, the equalization stage comprises an attenuator with positive slope. The attenuator attenuates the RF signal to avoid increasing the noise within the router 400". In some embodiments, the equalization stages 440, 450, 460 are configurable, such as, for example, the attenuation levels are customizable. In some other embodiments, the equalization stages 440, 450, 460 are not configurable.

Figure 4D:
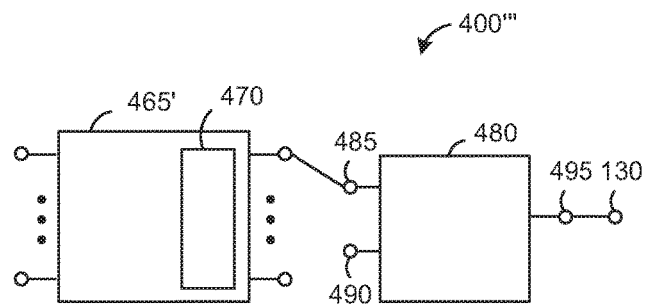
FIG. 4D illustrates another example of a RF signal path from a r×s output switch matrix to a RF output terminal 130 for a RF router 400'"

Reference is next made to FIG. 4D illustrating another example of a RF signal path from a r×s output switch matrix to a RF output terminal 130 for a RF router 400'''. Router 400''' comprises an automatic gain control stage 470 to adjust the gain of incoming RF signals. Router 400''' maintains a sufficiently high RF signal gain level thought out the router so that the RF signals are not degraded by some or all of the splitters, trace losses, equalization stages, power monitoring, tone monitoring or switch matrices etc.

Router 400''' comprises the automatic gain control stage 470 in some or all of the r×s output switch matrices 465'. The gain of the RF signals may be adjusted at the r×s output switch matrices 465' to maintain high output levels and to limit the signal noise. In various embodiments, the automatic gain control stage 470 at the r×s output switch matrices 465' are configurable, such as, for example, the gain is customizable. For example, different r×s output switch matrices 465' may be controlled to provide a different gain at the corresponding gain control stages. In some other embodiments, router 400''' may comprise one or more automatic gain control stage 470 in other locations along the signal path.

Router 400''' also comprises a combiner 480. In the illustrated embodiment, combiner 480 is a 2×1 passive combiner, which comprises two incoming ports 485, 490 coupled to the r×s output switch matrices, such as the r×s output switch matrix 485' and another r×s output switch matrix, and one outgoing port 495 coupled to the RF output terminal 130. The two incoming ports 485, 490 receive RF signals from two r×s output switch matrices and the one outgoing port 495 provides a combined RF signal. The combiner RF signal is the output RF signal seen at the RF output terminal 130.

Figure 5:
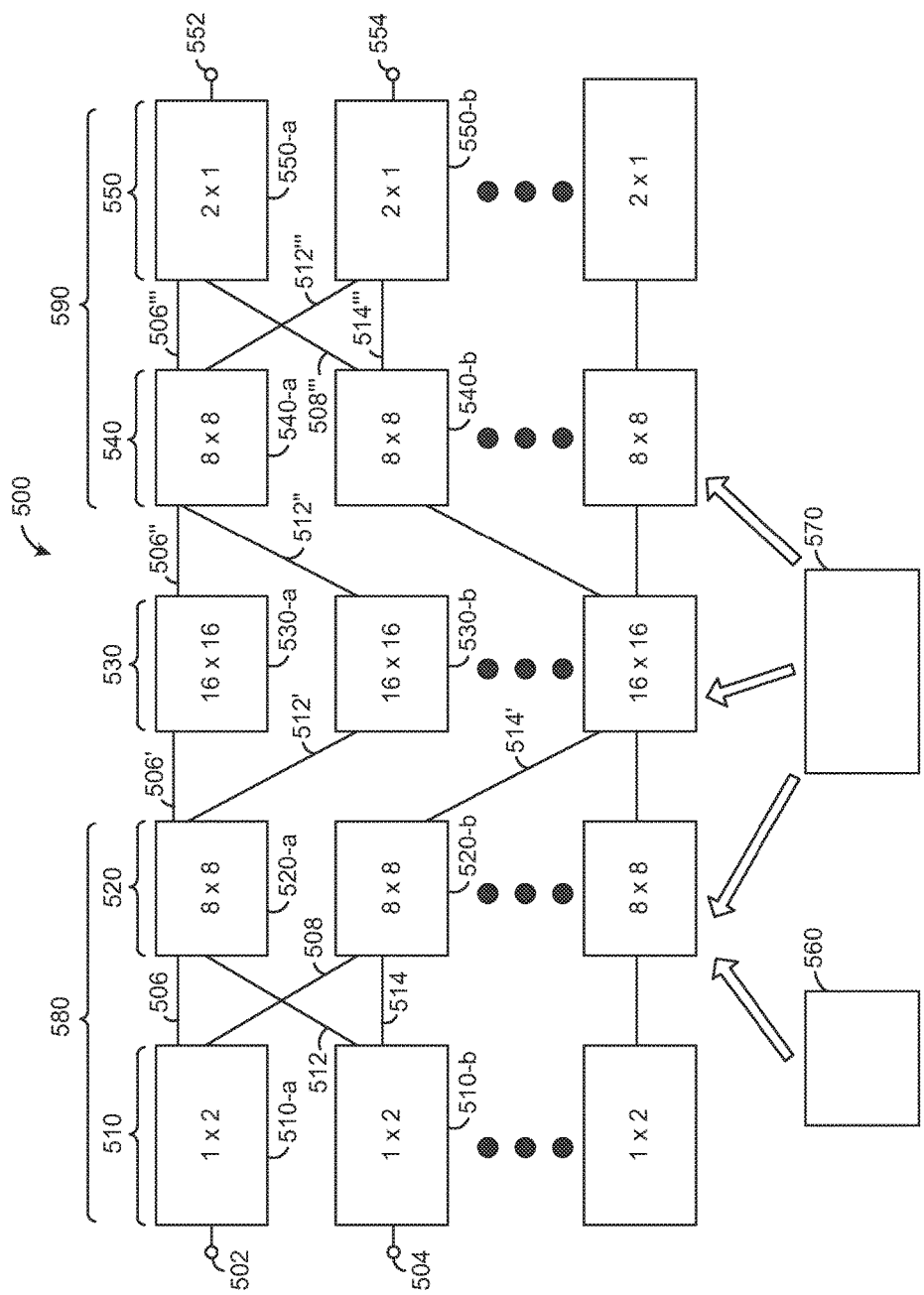
FIG. 5 illustrates an example embodiment of a router 500 with a dimension of 128 RF input terminals×128 RF output terminals.

Reference is next made to FIG. 5, illustrating an example embodiment of a router 500 with a dimension of 128 RF input terminals×128 RF output terminals. Router 500 comprises an input stage 580 and an output stage 590. The input stage 580 comprises 128 RF input terminals, such as RF input terminals 120. For example, router 500 comprises a first RF input terminal 502, a second RF input terminal 504 and so on. RF router 500 can receive up to 128 input RF signals, where each RF input terminal is configured to receive an input RF signal.

The input stage 580 also comprises a plurality of u×v input switch matrices 520 and a plurality of splitters 510. Each splitter 510 is connected to each RF input terminal for coupling a corresponding input RF signal to at least one u×v input switch matrix 520. Each splitter 510 receives an input RF signal and provides a corresponding RF signal at two locations. For example, router 500 comprises a first splitter 510-a that receives an input RF signal from RF input terminal 502 and provides corresponding RF signals at two outgoing ports 506, 508 of the splitter 510-a. Similarly, router 500 comprises a second splitter 510-b that receives an input RF signal from RF input terminal 504 and provides corresponding RF signals at two outgoing ports 512, 514 of the splitter 510-b. In other embodiments, splitter 510 may be configured to receive an input RF signal and provide it at more than one location.

Each u×v input switch matrix 520 of router 500 is connected to u splitters 510. In router 500, each u×v input switch matrix 520 is a 8×8 switch matrix and is configured to receive up to 8 inputs. Each 8×8 input switch matrix 520 is connected to 8 different splitters 510 at one of the two outgoing ports. For example, in router 500, a first 8×8 input switch matrix 520-a is connected to outgoing port 506 of the first splitter 510-a at one of the 8 inputs. The first 8×8 input switch matrix 520-a is also connected to outgoing port 512 of the second splitter 510-b at another of the 8 inputs.

Similarly, a second 8×8 input switch matrix 520-b is connected to the other outgoing port 508 of the first splitter 510-a at one of the 8 inputs and connected to the other outgoing port 514 of the second splitter 510-b at another of the 8 inputs. In router 500, each of the u×v input switch matrix 520 has each of its u inputs connected to exactly one of the plurality of splitters 510 at exactly one of the two outgoing ports.

Router 500 further comprises a plurality of p×q intermediate switch matrices 530 coupled between the plurality of u×v input switch matrices 520 and a plurality of r×s output switch matrices 540. In router 500, each of the p×q intermediate switch matrices 530 are 16×16 switch matrices configured to connect up to 16 inputs to 16 outputs.

Each of the p×q intermediate switch matrices 530 has its inputs coupled to outputs of the u×v input switch matrices 520 such that each of the p inputs of each p×q intermediate switch 530 is connected to exactly one output of the plurality of u×v input switch matrices 520. In router 500, each of the p inputs of each p×q intermediate switch matrices 530 are connected to outputs of different u×v input switch matrices 520.

For example, router 500 comprises a first intermediate switch matrix 530-a, with 16 inputs and 16 outputs. Each of the 16 inputs of the first intermediate switch matrix 530-a is connected to exactly one output of the u×v input switch matrices 520, and the exactly one output corresponds to a different u×v input switch matrix 520, such as output 506' of the first input switch matrix 520-a.

As illustrated, each of the 8 outputs of the first input switch matrix 520-a is connected to a different p×q intermediate switch matrix 530. For example, output 506' of the first input matrix 520-a is connected to the first intermediate switch matrix 530-a and the output 512' of the first input matrix 520-a is connected to a second intermediate switch matrix 530-b. Similarly, output 514' of the second input switch matrix 520-b is connected to a different intermediate switch matrix 530-p. The interconnections of various switch matrices are illustrated in more detail in FIG. 6.

The output stage 590 of router 500 comprises a plurality of r×s output switch matrices 540 and a plurality of combiners 550. In router 500, inputs of each r×s output switch matrices 540 are connected to outputs of the p×q intermediate switch matrices 530 such that each input of each r×s output switch matrix 540 is coupled to exactly one output of the plurality of p×q intermediate switch matrices 530. Furthermore, inputs of each r×s output switch matrix 540 are connected to a different p×q intermediate switch matrix 530.

In router 500, each of the r×s output switch matrix 540 is a 8×8 switch matrix having 8 inputs and 8 outputs. Each one of the 8 inputs of each output switch matrix 540 is connected to a different 16×16 intermediate switch matrix 530. For example, a first output switch matrix 540-a has one of the 8 inputs connected to output 506" of the first intermediate switch matrix 530-a and another of the 8 inputs connected to output 512" of the second intermediate switch matrix 530-b.

Combiners 550 are coupled between the plurality of r×s output switch matrices 540 and a plurality of RF output terminals, such as RF output terminals 130. In router 500, each combiner 550 is connected to exactly one output of two different r×s output switch matrices 540. In some other embodiments, each combiner may be connected to more than two outputs of different r×s output switch matrices.

For example, a first combiner 550-a is connected to output 506''' of the first 8×8 output switch matrix 540-a and output 508''' of a second 8×8 output switch matrix 540-b. Similarly, a second combiner 550-b is connected to output 512''' of the first 8×8 output switch matrix 540-a and output 514''' of the second 8×8 output switch matrix 540-b.

In router 500, each combiner 550 receives RF signals at the two incoming ports and combines two different signals into one outgoing port. The outgoing port of each combiner 550 is connected to an RF output terminal. For example, the outgoing port of the first combiner 550-a is connected to RF output terminal 552 and the outgoing port of the second combiner 550-b is connected to RF output terminal 554. In some other embodiments, the combiners 550 may be coupled with impedance matching stages before connecting to the RF output terminals.

RF router 500 comprises 32 u×v input switch matrices 520, where each input switch matrix 520 is a 8×8 switch circuit. Router 500 comprises 16 p×q intermediate switch matrices 530, where each intermediate switch matrix 530 is a 16×16 switch circuit. Router 500 further comprises 32 r×s output switch matrices 540.

Router 500 further comprises a tone injection module 560 and a tone monitoring module 570. Tone injection module 560 is configured to add or insert tones to the RF signals. In some examples, the tone injection module 560 inserts audio tones to the RF signals. In some other examples, the tones may be inaudible but detectable by the tone monitoring module 570. In some further examples, the tones may be out of band with the RF signals so that the tones do not affect the signals.

The tones may be inserted when the RF signals are received by u×v input switch matrices 520. For example, the tone may be inserted when the RF signal reaches a first amplifier within the u×v input switch matrix 520.

Router 500 further comprises a tone monitoring module 570 configured to monitor injected tones at various stages along the signal path. The tone monitoring module 570 facilitates tone monitoring to determine a component failure along the signal path, such as, for example, an input switch matrix failure, an intermediate switch matrix failure etc.

The tone monitoring module 570 may also be configured to monitor power corresponding to input RF signals. For example, the tone monitoring module 570 may measure an incoming signal power at a first input switch matrix and at a second input switch matrix, where the second switch matrix is configured to receive the same inputs as the first input switch matrix. The measured signal powers may be compared to detect faulty input switch matrix.

The tone monitoring module 570 is also configured to monitor tones at the input of p×q intermediate switch matrices 530 and at the input of r×s output switch matrices 540 prior to any other processing. For example, the tone is monitored when the incoming RF signal reaches a first amplifier within a p×q intermediate switch matrix 530. Similarly, the tone is monitored when the incoming RF signal reaches a first amplifier within a r×s output switch matrix 540.

In some embodiments, the r×s output switch matrices monitor one another. For example, a r×s output switch matrix, which may or may not be driving a RF signal, can monitor what the other r×s output switch matrix coupled to the same RF output terminal is driving. This facilitates fault detection with r×s output switch matrices.

The r×s output switch matrices may also be configured to remove the tone inserted by the tone injection module 560 so that the corresponding output RF signal does not comprise the tone. Accordingly, the output RF signal reaching the downstream device or user is not affected by the tones.

At least one of the plurality of u×v input switch matrices 520, p×q intermediate switch matrices 530 and r×s output switch matrices 540 in router 500 are redundant switch circuits. Redundancy is discussed in further detail below with reference to FIG. 6.

Figure 6:
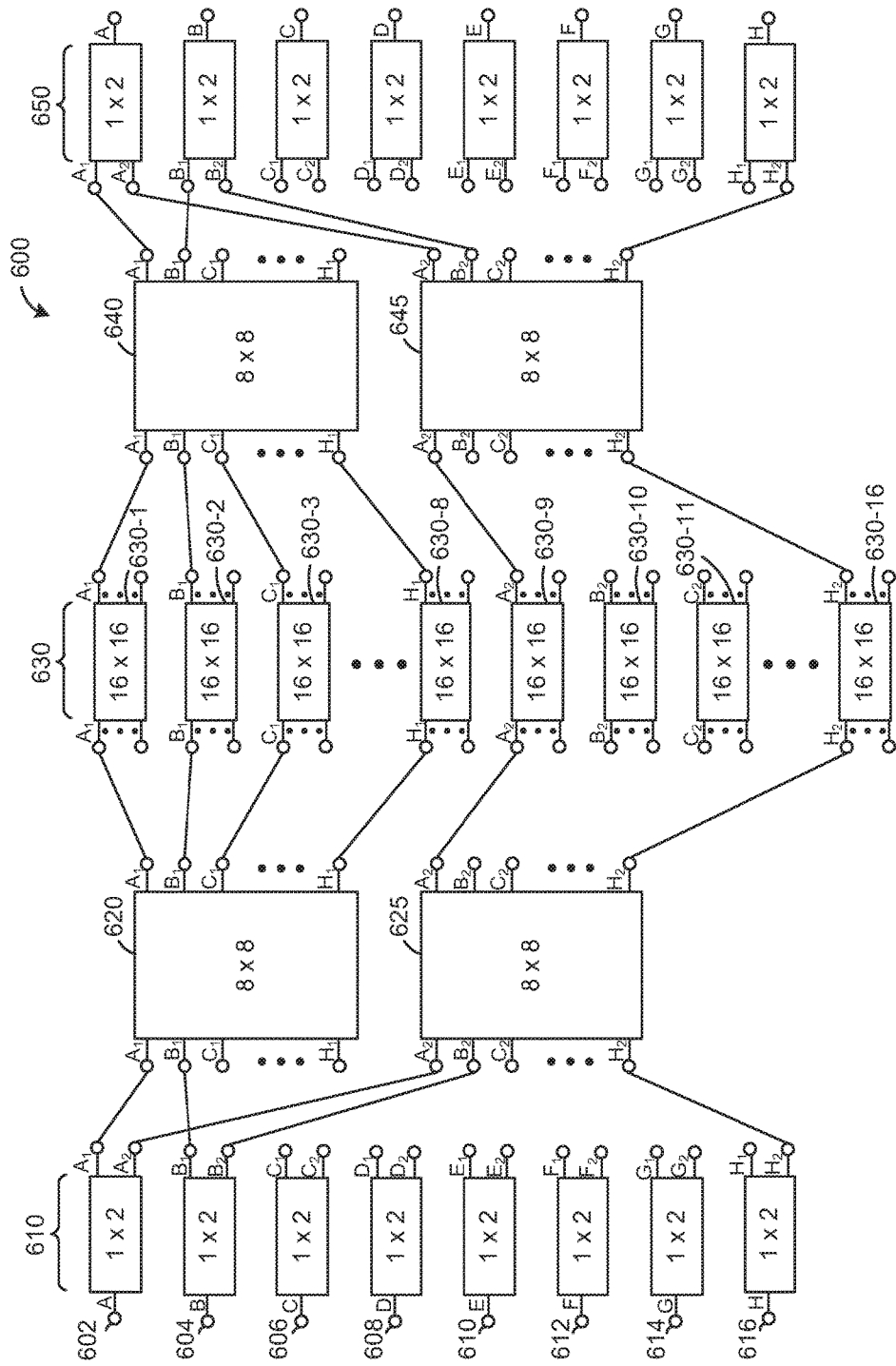
FIG. 6 illustrates an example embodiment of a RF router 600 for demonstrating a built-in redundancy in the router 500 of FIG. 5.

Reference is next made to FIG. 6 illustrating an example embodiment of a RF router 600. Router 600 is a sub-set of router 500 of FIG. 5 for illustrating a built-in redundancy in the router 500. RF router 600 comprises eight RF input terminals, eight splitters 610, a first u×v input switch matrix 620, a second u×v input switch matrix 625, 16 p×q intermediate switch matrices 630, a first r×s output switch matrix 640, a second r×s output switch matrix 645, and 8 combiners 650.

The interconnection of various components is illustrated by use of same alpha-numeric labels. For example, each splitter 610 is connected to one RF input terminal A-H. Each splitter 610 has two outgoing ports, such as a splitter connected to RF input terminal A has two outgoing ports $A_1$ and $A_2$. Each input of the first u×v input switch matrix 620 is connected to a first of the two outgoing ports of each of the eight splitters 610. Each input of the second u×v input switch matrix 625 is connected to a second of the two outgoing ports of each of the eight splitters 610. Accordingly, both the first input switch matrix 620 and the second input switch matrix 625 receive signals corresponding to the same input RF signal. This creates redundancy in the router 600 since even if one of the input switch matrices 620, 625 undergoes failure, the RF signal path is not lost.

Similarly, the plurality of p×q intermediate switch matrices 630 and the plurality of r×s output switch matrices, such as 8×8 output switch matrices 640, 645 can provide redundant signal paths in router 600. As illustrated, each output of the first u×v input switch matrix 620 is connected to a different p×q intermediate switch matrix 630. As illustrated, output $A_1$ of the first input switch matrix 620 is connected to one input of a first p×q intermediate matrix 630-1. Output $B_1$ of the first input switch matrix 620 is connected to one input of a second p×q intermediate matrix 630-2 and output $C_1$ of the first input switch matrix 620 is connected to one input of a third p×q intermediate matrix 630-3.

In an event of component failure, such as failure of any 16×16 intermediate switch matrices 630, router 600 re-routes signal paths through other 16×16 intermediate switch matrices 630. The re-routing is based on switch matrix availability.

For example, in router 600, both the first p×q intermediate matrix 630-1 and the ninth p×q intermediate matrix 630-9 are configured to receive the same set of RF signals at the ID' inputs. Accordingly, in the event of a failure of any one of p×q intermediate switch matrices 630, such as the first p×q intermediate matrix 630-1, the RF router 600 can re-route the RF signal through another corresponding p×q intermediate switch matrices 630, such as the ninth p×q intermediate matrix 630-9 so that no RF signal is lost due to component failure.

Similarly, router 600 may connect output $H_2$ of the second input switch matrix 625 to one input of a sixteenth p×q intermediate switch matrix 630-16 in the event of failure of the eighth p×q intermediate switch matrix 630-8. Accordingly, in the event of component failure, at least one other p×q intermediate switch matrix 630 may be configured to receive the same set of RF signals at each of the p inputs as the failed p×q intermediate switch matrix 630, thereby creating a redundancy.

Similarly, in an event of component failure, such as failure of any 8×8 output switch matrices 640,645, router 600 re-routes signal paths through other 8×8 output switch matrices 640,645. As illustrated, both the first r×s output switch matrix 640 and the second r×s output switch matrix 645 are configured to receive the same set of RF signals at the r inputs. In the event of failure of 8×8 output switch matrix 640, router 600 may re-route signals through the 8×8 output switch matrix 645, thereby preventing any signal loss.

In various embodiments, the tone monitoring module 570 monitors any failure in the RF signal path within the router. Upon failure detection, a controller automatically re-routes a signal path within the router to prevent the loss of RF signals.

In some embodiments, router 600 comprises two controllers coupled to the various components of the router. The various switching matrices monitor how frequently they are polled by each controller. In the event that a switching matrix does not get polled by a controller within certain duration of time, the switching matrix informs the other controller that there may be a fault with the timed out controller. The duration of time for timeout may be a fixed pre-determined duration of time or a changeable duration of time. This may facilitate fault detection in the controllers within the router. Use of two controllers also provides controller redundancy within the router. Failure detection of one controller may trigger the router to switch to the functional controller while disregarding the timed out controller.

Figure 7:
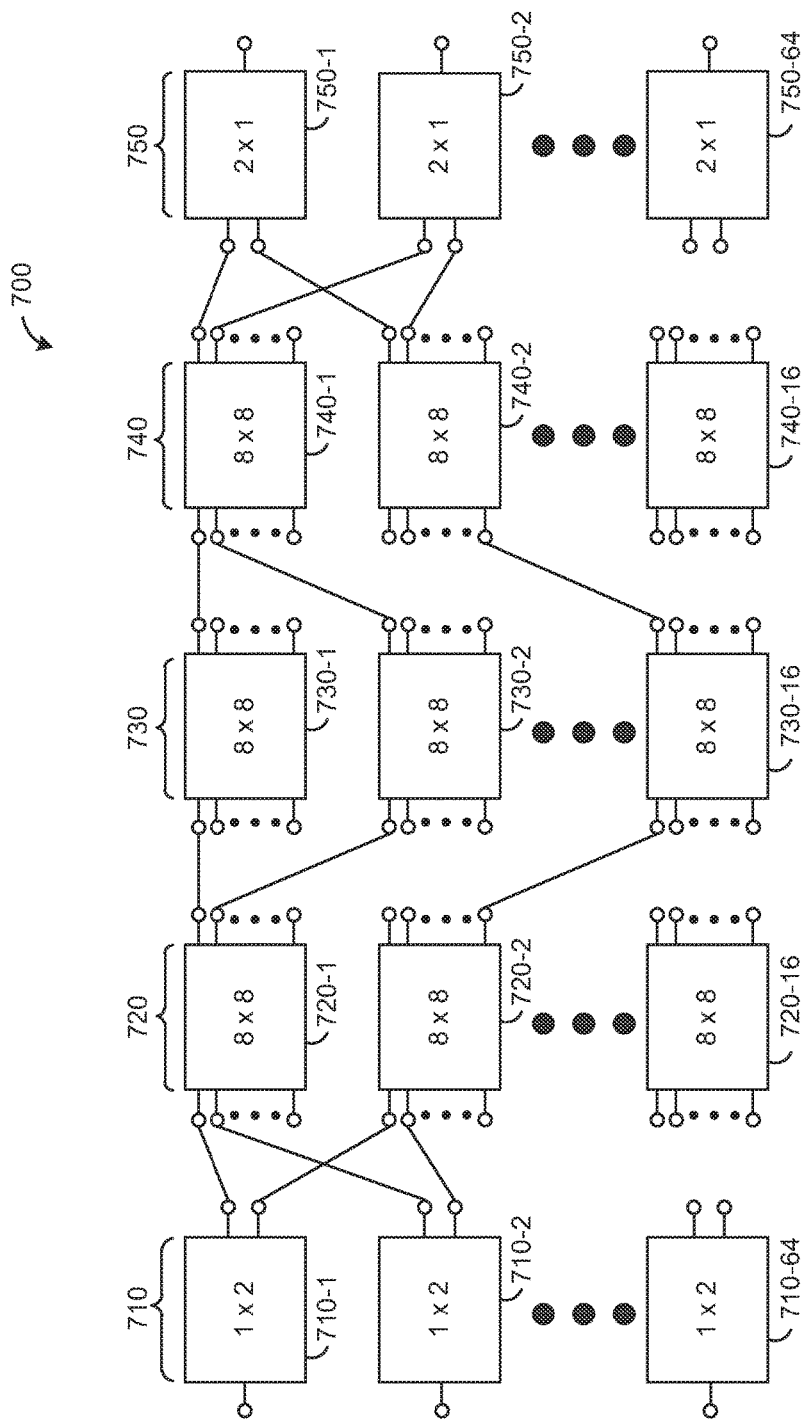
FIG. 7 illustrates an example embodiment of a RF router 700 with a dimension of 64 RF input terminals×64 RF output terminals.

Reference is next made to FIG. 7 illustrating an example embodiment of a RF router 700 with a dimension of 64 RF input terminals×64 RF output terminals. Router 700 is configured to provide an architecture that facilitates internal RF signal re-routing.

RF router 700 comprises 64 RF input terminals and 64 splitters 710 with each RF input terminal connected to a connector. RF router 700 further comprises 16 u×v input switch matrices 720, 16 p×q intermediate switch matrices 730, and 16 r×s output switch matrices 740. Each of the 64 splitters 710 comprises a 1×2 splitting circuit. Each u×v input switch matrix 720, each p×q intermediate switch matrix 730 and each r×s output switch matrix 740 comprises a 8×8 switching circuit.

RF router 700 further comprises 64 combiners 750 and 64 RF output terminals with each combiner 750 connected to a RF output terminal. In router 700, each combiner 750 comprises a 2×1 combiner circuit.

As illustrated, each of the outgoing port of each splitter 710 is connected to different u×v input switch matrices 720 at exactly one input. Each output of each u×v input switch matrix 720 is connected to different p×q intermediate switch matrices 730 at exactly one input.

The plurality of r×s output switch matrices 740 mirror the architecture and interconnections of the plurality of u×v input switch matrices 720 to the plurality of p×q intermediate switch matrices 730. Accordingly, at least one of the plurality of u×v input switch matrices 720, p×q intermediate switch matrices 730 and r×s output switch matrices 740 provide redundancy in the router 700 to facilitate re-routing of RF signals, for example, in the event of component failure.

Figure 8:
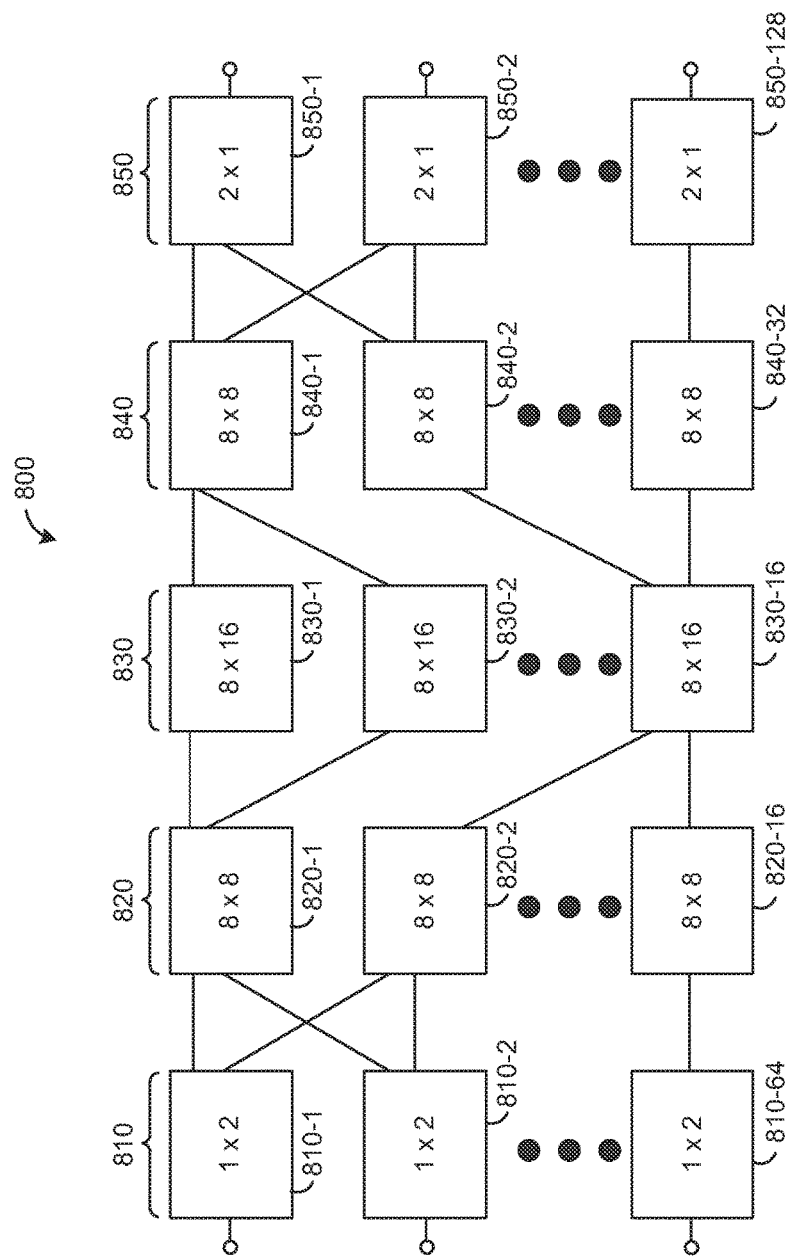
FIG. 8 illustrates an example embodiment of a RF router 800 with a dimension of 64 RF input terminal×128 RF output terminals.

Reference is next made to FIG. 8 illustrating an example embodiment of a RF router 800 with a dimension of 64 RF input terminal×128 RF output terminals. RF router 800 is configured to provide an architecture that facilitates internal RF signal re-routing.

RF router 800 comprises 64 RF input terminals and 64 splitters 810 where each splitter 810 is connected to RF input terminal. Each of the 64 splitters 810 comprises a 1×2 splitting circuit.

RF router 800 further comprises 16 u×v input switch matrices 820, 16 p×q intermediate switch matrices 830 and 32 r×s output switch matrices 840. Each u×v input switch matrix 820 comprises a 8×8 switching circuit. Each p×q intermediate switch matrix 830 comprises a 8×16 switching circuit and each r×s output switch matrix 840 comprises a 8×8 switching circuit.

RF router 800 further comprises 128 combiners 850 and 128 RF output terminals where each combiner 850 is connected to a RF output terminal. In router 800, each RF combiner 850 comprises a 2×1 combiner circuit.

In some other embodiments, the RF router may have a dimension of 1024 RF input terminals×1024 RF output terminals. In this embodiment, the RF router comprises an input stage, a middle stage and an output stage. The input stage comprises 1024 splitters and 16 u×v input switch matrices. The splitters comprise a 1×2 splitting circuit. The splitters may be passive or active splitters. For example, the splitters may be Wilkinson splitters. Each of the u×v input switch matrix comprises a 128×128 switching circuit.

The middle stage comprises 256 p×q intermediate switch matrices. Each of the p×q intermediate switch matrix comprises a 8×8 switching circuit. The output stage comprises 16 r×s output switch matrices. Each of the r×s output switch matrices comprises a 128×128 switching circuit. The output stage further comprises 1024 combiners configured to combine two signals into one. The combiners may be passive or active combiners. For example, the combiners may be Wilkinson combiners.

The RF router in this embodiment may be assembled over multiple chassis cascaded together. For example, the input stage, the middle stage and the output stage may be in three different chassis.

Figure 9:
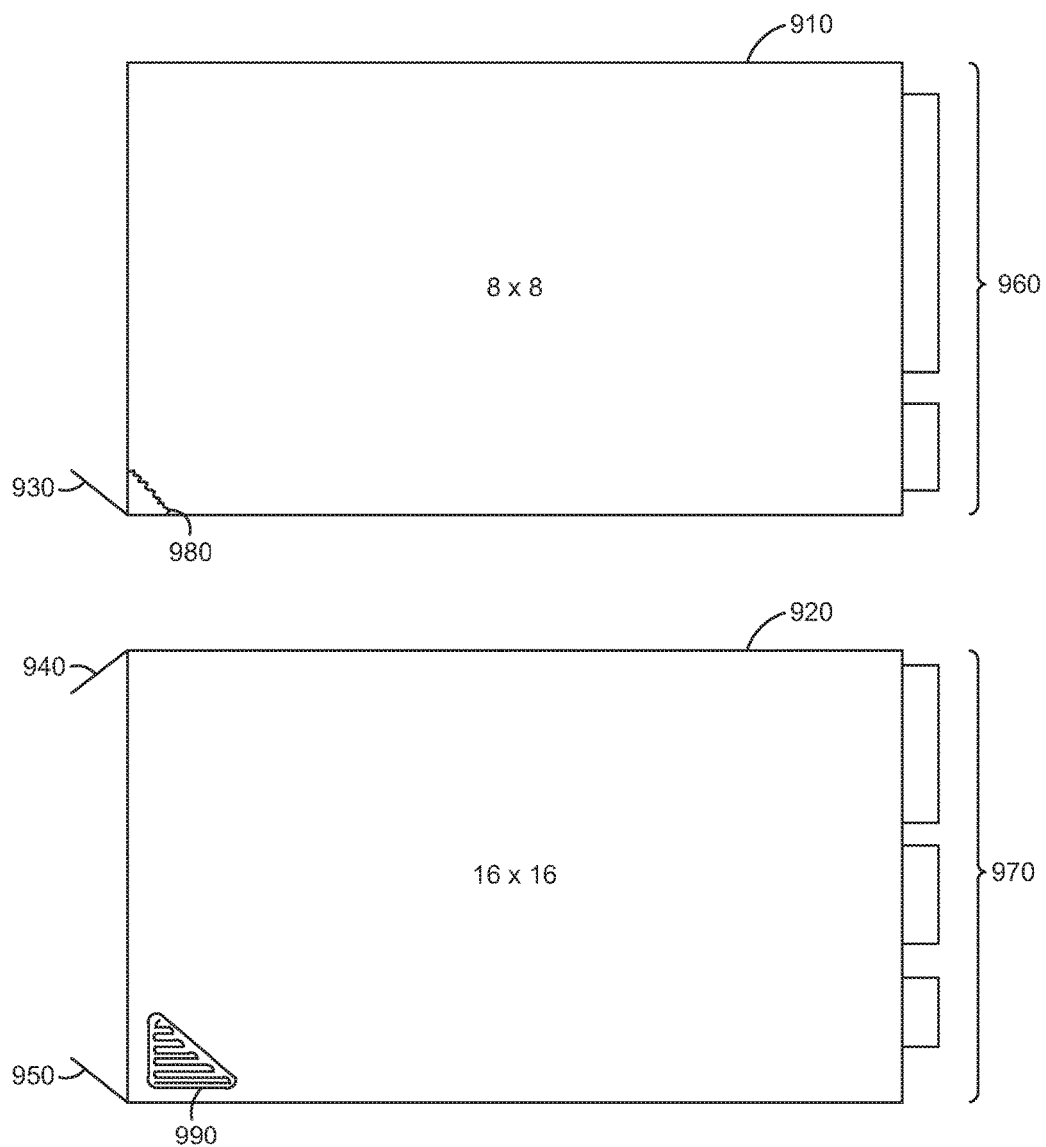
FIG. 9 illustrates a module ejector assembly of switching matrices.

Reference is next made to FIG. 9, illustrating a module ejector assembly of switching matrices. In this embodiment, a 8×8 switch matrix, such as a u×v input switch matrix 140 of FIG. 1, is assembled on a card 910 and a 16×16 switch matrix, such as p×q intermediate switch matrix 160 of FIG. 1, is assembled on a card 920. Each card 910, 920 comprises a printed circuit board containing the switching circuitry.

As illustrated, card 910 comprises a module ejector 930. The card 910 comprises a connecting side 960 configured to be received by a connector mounted on the router. The module ejector 930 is connected to the card 910 on a side opposite to the connecting side 960. In other embodiments, the module ejector 930 may be connected to the card 910 on any other side, other than the connecting side 960.

The card 920 comprises two module ejectors, a first module ejector 940 and a second module ejector 950. The connecting side 970 of the card 920 is received by a connector mounted on the router. The first module ejector 940 and the second module ejector 950 are illustrated on the opposite side of the card 920 than the connecting side 970. In other embodiments, the first module ejector 940 and the second module ejector 950 may be connected elsewhere on the card 920. The module ejectors 930, 940, 950 are rotatable around a fixed axis.

Card 910 comprises a sensor 980 to detect the removal of the card 910 from a connector mounted on the router. Similarly, card 920 comprises a sensor 990. Cards 910, 920 may comprise more than one sensors to detect card removal from connectors. For example, card 920 may comprise another sensor close to the first module ejector 940. In the illustrated embodiments, the sensors 980, 990 are capacitive sensors comprising capacitive traces.

When card 910 is connected to the router at the connecting side 960, the module ejector 930 is in a closed position. In this position, the module ejector 930 overlies the sensor 980, either in part or entirely.

Similarly, when card 920 is connected to the router at the connecting side 970, both the first module ejector 940 and the second module ejector 950 are in a closed position. In this position, the module ejector 950 overlies the sensor 990, either in part or entirely. In those embodiments where the card 920 comprises more than one sensor, all the corresponding module ejectors overlie the sensors either in part or entirety in the closed position.

The sensors 980, 990 detect the proximity of approaching objects, such as, for example, a finger of a router operator, just before the approaching object establishes a contact with the cards 910, 920 or the module ejectors 930, 940, 950. For example, when the sensors 980, 990 are capacitive sensors, the proximity of approaching objects or the contact by approaching objects is detected by detecting a change in the capacitance in the sensors 980, 990.

This detection facilitates re-routing of signal paths within the router such that no signal is lost when the cards 910, 920 are removed or disconnected from the router.

In various embodiments, this detection of upcoming or actual card removal also triggers a controller to close pins of the self-terminating connector corresponding to the card. The self-terminating connector introduces terminal impedance equal to the internal signal impedance for impedance matching in the signal path and prevents impact on other signals.

In one embodiment, a tone monitoring module, such as module 570, detects whether any switch matrix along a signal path has failed, such as, for example, failure of any input switch matrices 520, any intermediate switch matrices 530 etc. A failed or defective card or input matrix is replaced with a new card to restore redundancy in the router.

Replacing a bad or faulty card in a signal path in the router may cause router and signal disturbances. However, the router in the example embodiments disclosed herein comprise cards configured to provide hot swappable and hot pluggable capabilities. Hot swappable and hot pluggable cards may be removed and replaced without significantly interrupting the router.

Reference is again made to FIG. 5 illustrating an example embodiment of a router 500. The backplane of router 500 is configured to match lengths of RF signal paths within the router. In the backplane of router 500, the lengths of each of the traces from splitters 510 to u×v input switch matrices 520 are equal. Similarly, the lengths of each of the traces from u×v input switch matrices 520 to p×q intermediate switch matrices 530 are equal. The backplane of router 500 further comprises equal traces from the p×q intermediate switch matrices 530 to r×s output switch matrices 540 and from r×s output switch matrices 540 to combiners 550.

Figure 10A:
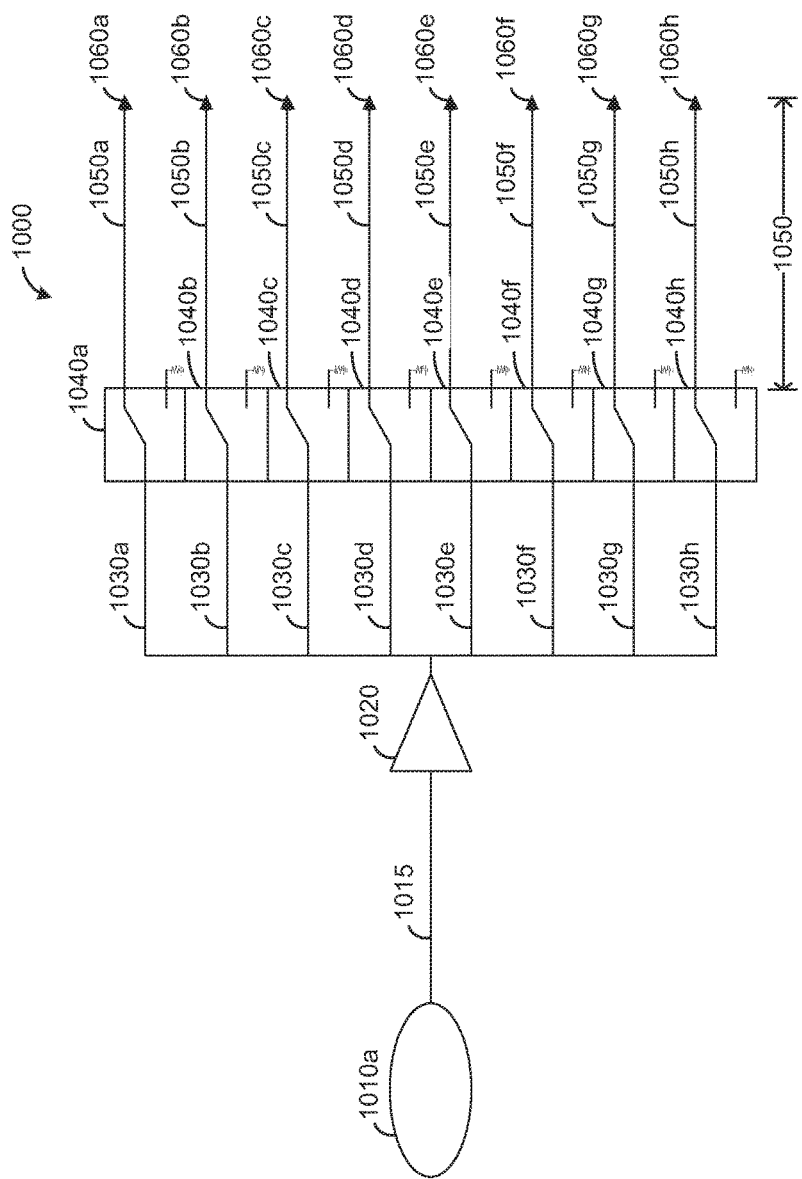
FIG. 10A illustrates an example embodiment of an input block 1000 of an input switch matrix.
Figure 10B:
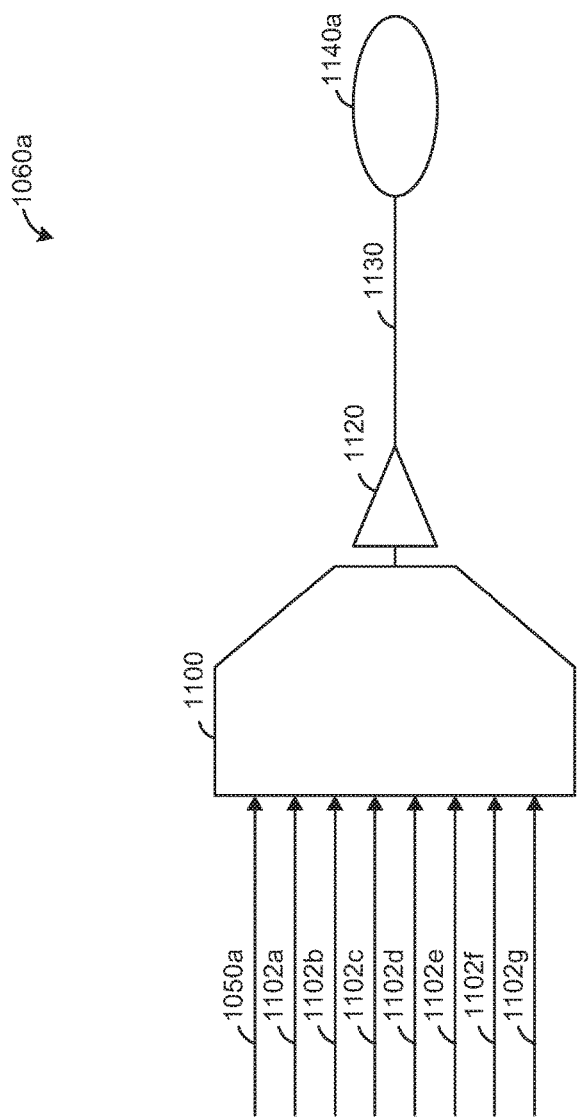
FIG. 10B illustrates an example embodiment of an output block 1060a of an input switch matrix.

Reference is next made to FIG. 10A, illustrating an example embodiment of an input block 1000 of an input switch matrix, such as a u×v input switch matrix 520-a, which is a 8×8 switch matrix. The input block 1000 illustrates the switching circuitry corresponding to only one of the 8 input terminals of the input switch matrix 520-a. The input block 1000 comprises an input terminal 1010a for receiving an input RF signal and switches it to one or more of the 8 output blocks 1060a-1060h. An example embodiment of an output block is illustrated in FIG. 10B.

Coupled to each output block 1060a-1060h is a 2×1 switch 1040a-1040h. For example, coupled to output block 1060a is a 2×1 switch 1040a. The 2×1 switch is configured to connect an input RF signal received at the input terminal 1010a to the corresponding output block 1060a in on stage and to ground in off stage. The switch may connect the input RF signal to ground in off stage via a resistor. A router controller is configured to turn the switch on or off to facilitate signal routing within the router.

As illustrated, in the input block 1000, the input RF signal received at the input terminal 1010a undergoes some signal processing at signal processing module 1020, such as, for example, signal amplification. Trace 1015 connects the input terminal 1010a to the signal processing module 1020. The signal processing module 1020 is connected to each of the 2×1 switches 1040a-1040h via traces 1030a-1030h. For example, the signal processing module 1020 connects to the switch 1040a via trace 1030a.

In the input switch matrix 1000, each of the switches 1040a-1040h are connected to the output blocks 1060a-1060h via traces 1050a-1050h. For example, switch 1040a is connected to the output block 1060a via trace 1050a.

In the various example embodiments of routers disclosed herein, each input switch matrix 1000 is configured to match trace lengths within the signal path. All traces 1050a-1050h connecting switches 1040a-1040h to output blocks 1060a-1060h are equal, illustrated as trace 1050.

Although only one of the 8 input terminals of the input switch matrix is illustrated by input block 1000, the input switch matrix is configured to have trace length matching across all of the 8 inputs.

The input switch matrix is configured to have an equal trace length of sum of traces 1015 and 1050 across all 8 inputs, i.e. the sum of trace lengths between an input terminal of the input switch matrix, such as the input terminal 1010a and the corresponding input processing module, such as the input processing module 1020, as well as between the switches, such as switches 1040a-1040h and the output terminals, such as the output terminal 1050a-1050h (trace 1050) are equal across all of the 8 inputs. Trace 1030a connecting the signal processing module 1020 to a first switch 1040a is equal across all inputs. Similarly, traces 1030b-1030h are equal across all inputs.

Reference is next made to FIG. 10B, illustrating an example embodiment of an output block 1060a of the u×v input switch matrix 520-a. The output block 1060a illustrates the switching circuitry corresponding to only one of the 8 output terminals of the input switch matrix 520-a. The output block 1060a comprises an output terminal 1140a for providing a RF signal corresponding to the input RF signal received at the input terminals of the input switch matrix.

The output block 1060a further comprises an 8×1 switch 1100, an output processing module 1120 and a trace 1130 connecting the output processing module 1120 to the output terminal 1140a. The 8×1 switch 1100 is connected to 8 2×1 switches from different input blocks of the u×v input switch matrix 520-a. For example, the 8×1 switch 1100 is connected to switch 1040a via trace 1050a. Other input blocks are configured to connect one of the 8 switches connected to the output block 1060a via traces 1102a-1102g.

In the various embodiments enclosed herein, a router is configured to match trace lengths across various signal paths within the input block 1000 and output block 1060a of the u×v input switch matrix 520-a.

The u×v input switch matrix 520-a is configured to have the sum of trace lengths corresponding to traces 1030a and 1130 equal along all input and output blocks. For example, the u×v input switch matrix 520-a is configured to have the sum of trace 1030b and trace length connecting an output processing module and an output terminal of output block 1060b equal to sum of traces 1030a and 1130. Similarly, sum of trace lengths 1030c and trace corresponding to trace 1130 in output block 1060c, sum of trace lengths 1030d and trace corresponding to trace 1130 in output block 1060d, sum of trace lengths 1030e and trace corresponding to trace 1130 in output block 1060e, sum of trace lengths 1030f and trace corresponding to trace 1130 in output block 1060f, sum of trace lengths 1030g and trace corresponding to trace 1130 in output block 1060g, sum of trace lengths 1030h and trace corresponding to trace 1130 in output block 1060h are all equal to each other and equal to sum of traces 1030a and 1130.

In various embodiments, the various routers disclosed herein provide redundancy with respect to other components within the router. For example, some routers disclosed herein provide low-noise block (LNB) power insertion and power supply redundancy. Such routers may comprise two or more LNB power inserters within the router chassis such that each LNB power inserter can provide power to all u×v input switch matrices. Similarly, such routers may comprise extra power supplies. For example, such routers may comprise three power supplies where only two are required for the router to function. Such routers may also comprise extra cooling capabilities, such as, for example, by using an extra fan. Extra cooling capabilities may also be provided by switching functional fans from a low cooling setting to a high cooling setting when one or more fans undergo failure. For example, a router chassis may comprise four fans for normal router functionality. The four fans may be configured to run at a low setting until one of the fans fail. In response, the remaining functional fans may then be configured to run at a high setting.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well known methods, procedures and components have not been described in detail so as not to obscure the description of the embodiments. Various modification and variations may be made to these exemplary embodiments without departing from the spirit and scope of the invention, which is limited only by the appended claims.

I claim:

1. A method for routing an input Radio Frequency (RF) signal in an RF router, the method comprising:
    operating the RF router, the RF router comprising an input stage and an output stage, the input stage comprising a plurality of RF input terminals, wherein each RF input terminal is configured to receive a RF signal, including the input RF signal, and wherein each input stage further comprises:
        a plurality of u×v input switch matrices, each of the plurality of u×v input switch matrices having u inputs and v outputs; and a plurality of splitters, wherein each splitter is connected to an RF input terminal for coupling a corresponding input RF signal to at least one u×v input switch matrix;
        a plurality of p×q intermediate switch matrices, each of the plurality of p×q intermediate switch matrices having p inputs and q outputs, wherein inputs of each p×q intermediate switch matrices are coupled to outputs of the u×v input switch matrices such that each input of each p×q intermediate switch matrix is coupled to exactly one output of the plurality of u×v input switch matrices; and
    wherein an output stage comprising:
        a plurality of r×s output switch matrices, each of the plurality of r×s output switch matrices having r inputs and s outputs, wherein inputs of each r×s output switch matrix are coupled to outputs of the p×q intermediate switch matrices such that each input of each r×s output switch matrix is coupled to exactly one output of the plurality of p×q intermediate switch matrices; and
        a plurality of combiners coupled between the plurality of r×s output switch matrices and a plurality of RF output terminals, wherein at least one combiner is configured to couple different r×s output switch matrices to one of the plurality of RF output terminals, and wherein each RF output terminal is configured to provide an output RF signal; and
    wherein at least one of the plurality of u×v input switch matrices, at least one of the plurality of p×q intermediate switch matrices, and at least one of the plurality of r×s output switch matrices are redundant;
    operating at least one switch matrix to route the input RF signal from a corresponding RF input terminal to an RF output terminal, the at least one switch matrix being selected from the group consisting of at least one of the plurality of u×v input switch matrices, at least one of the plurality of p×q intermediate switch matrices, and at least one of the plurality of r×s output switch matrices;
    detecting at least one signal path event associated with the at least one switch matrix;
    determining availability of at least one alternate switch matrix, the at least one alternate switch matrix being selected from the group consisting of at least one of the plurality of u×v input switch matrices, at least one of the plurality of p×q intermediate switch matrices, and at least one of the plurality of r×s output switch matrices;
    operating the at least one switch matrix to cease routing the input RF signal; and
    operating the at least one alternate switch matrix to route the input RF signal,
    wherein the at least one alternate switch matrix is selected such that the input RF signal continues to be routed from the RF input terminal to the RF output terminal without loss.

2. The method of claim 1 wherein detecting the at least one signal path event comprises detecting a component failure associated with the at least one switch matrix.

3. The method of claim 1, wherein detecting the at least one signal path event comprises detecting a signal power associated with the input RF signal traversing through the at least one switch matrix.

4. The method of claim 1, wherein detecting the at least one signal path event comprises:
    providing an added tone to the input RF signal;

monitoring the added tone in each switch matrix traversed by the input RF signal; and determining that the at least one signal path event has occurred based on at least one property of the added tone at the each switch matrix.

5. The method of claim 4, wherein the at least one signal path event is determined based on a signal power associated with the added tone.

6. The method of claim 1, wherein detecting the at least one signal path event comprises detecting removal of the at least one switch matrix.

7. The method of claim 6, wherein detecting the at least one signal path event comprises detecting proximity of an object to the at least one switch matrix.

8. The method of claim 7, wherein the object comprises a user touch.

* * * * *